US008770567B2

(12) United States Patent
Piggott et al.

(10) Patent No.: US 8,770,567 B2
(45) Date of Patent: Jul. 8, 2014

(54) CUSHIONED SUPPORT PLATFORM (75) Inventors: David C Piggott, Lakefield (CA); Gordon Buchholz, Peterborough (CN)

(73) Assignee: Quickmill Inc., Peterborough (CA)

( * ) Notice: Subject to any disclaimer, the term of this patent is extended or adjusted under 35 U.S.C. 154(b) by 543 days.

(21) Appl. No.: 12/898,921

(22) Filed: Oct. 6, 2010

(65) Prior Publication Data

US 2012/0207562 A1   Aug. 16, 2012

Related U.S. Application Data (60) Provisional application No. 61/249,039, filed on Oct. 6, 2009.

(51) Int. Cl.
*B25B 1/24* (2006.01)
*B23Q 1/03* (2006.01)

(52) U.S. Cl.
CPC ............ *B23Q 1/035* (2013.01); *B25B 1/2421* (2013.01)
USPC .......................................... 269/266; 269/310

(58) Field of Classification Search
CPC ............................ B25B 1/2421; B23Q 1/035
USPC ........ 269/54, 54.4, 310, 289 R, 53, 296, 309, 269/316, 317, 265, 266
See application file for complete search history.

(56) References Cited

U.S. PATENT DOCUMENTS

| | | | | |
|---|---|---|---|---|
| 95,914 A * | 10/1869 | Kohler et al. | ................. | 269/310 |
| 1,178,020 A * | 4/1916 | Leonard | ........................... | 72/476 |
| RE23,732 E * | 11/1953 | Cleveland | ..................... | 269/310 |
| 3,669,333 A * | 6/1972 | Coucoulas | ..................... | 228/5.5 |
| 3,729,185 A * | 4/1973 | Roeske | ........................... | 269/20 |
| 3,938,798 A * | 2/1976 | Solie et al. | ...................... | 269/20 |
| 4,200,272 A * | 4/1980 | Godding | ......................... | 269/26 |
| 4,396,186 A * | 8/1983 | Solie et al. | ..................... | 269/310 |
| 5,138,772 A * | 8/1992 | Barnes | ............................ | 33/613 |
| 5,897,108 A * | 4/1999 | Gordon et al. | .................. | 269/50 |
| 5,984,293 A * | 11/1999 | Abrahamson et al. | ........ | 269/266 |
| 6,022,009 A * | 2/2000 | Hill | ................................ | 269/47 |
| 6,264,186 B1 * | 7/2001 | Hill | ................................ | 269/47 |
| 7,204,481 B2 * | 4/2007 | Sears et al. | .................... | 269/266 |
| 2009/0036281 A1 | 2/2009 | Piggott | | |

FOREIGN PATENT DOCUMENTS

| | | | | |
|---|---|---|---|---|
| CA | 2635824 A1 | 12/2008 | | |
| JP | 01109042 A * | 4/1989 | ............... | B23Q 3/06 |

* cited by examiner

*Primary Examiner* — Lee D Wilson
*Assistant Examiner* — Jamal Daniel
(74) *Attorney, Agent, or Firm* — Middleton Reutlinger; Chad D. Bruggeman; John F. Salazar (57) ABSTRACT

A work piece supporting device is disclosed for limiting vibrations caused by work piece processing. The device comprises a base portion having a plurality of openings therein. Each opening forms a well with an inner boundary and a peripheral surface extends therefrom. A plurality of elongate supports are each arranged to be located in a corresponding well for supporting the work piece when positioned above the base portion. A resilient support is positioned in the well between the inner boundary and the elongate support. The elongate support is movable between a first position in which the resilient support is in a relatively less compressed configuration to a second position in which the resilient support is in a relatively more compressed configuration.

16 Claims, 10 Drawing Sheets

CUSHIONED SUPPORT PLATFORM

REFERENCE TO COPENDING APPLICATION

The present application is related to and claims benefit of priority to U.S. Provisional Patent Application No. 61/249,039, filed Oct. 6, 2009, entitled "CUSHIONED SUPPORT PLATFORM", the entire subject matter of which is hereby fully incorporated herein by reference.

FIELD OF THE INVENTION

The present invention relates to a cushioned support platform for limiting vibrations of a work piece during work piece processing, such as drilling.

BACKGROUND OF THE INVENTION

Currently drilling of certain metals is nearly impossible due to vibrations imposed on a work piece by a drilling tool during drilling operations. Carbide drilling tools are often employed in the drilling of metal owing to hardness of the carbide metal composition which makes the drilling tool more durable, drill faster and last longer than non-carbide drilling tools. Also, the drilling tool tips of carbide bits tend to maintain a cutting edge longer during use which makes them ideal for the processing of metals. The hardness of the carbide metal, however, has the drawback in that carbide is thus relatively brittle compared to non-carbide counterparts and is known to break when processing a work piece which tends to vibrate. The resulting vibrations are transferred from the work piece to the drilling tool during drilling contact. Quickly, the relative brittleness of the carbide gives way to the vibrations and the drilling tool breaks, thus rendering it useless. Therefore, in order to avoid breakage of the drilling tools, one must drill metals when using a carbide drill slower than optimal speed which results in lower than optimal productivity rates and an increase in man hours required to complete a task.

Furthermore, the vibrations created by processing a work piece is a cause of poor quality of the resultant bore, which is unacceptable in many parts. Therefore, in order to maintain the quality of a bore, an operator of the drilling apparatus must drill at a lower drilling speed. However, in the interests of productivity, this not a viable long-term solution to maintain bore quality. Reducing the vibrations in the work piece also aids in maintaining bore quality as well as allow for more efficient drilling of a work piece to increase productivity.

Several methods of reducing work piece vibrations during drilling have been tried. For example, previous attempts include reducing the speed of drilling, varying the drill speed during the course of drilling or processing and applying excessive foot pressure to secure the work pieces. However, none of these conventional approaches have proved satisfactory for reducing or substantially eliminating work piece vibrations during drilling to maintain the integrity of carbide cutting edges and corresponding work piece quality.

There is a need to provide a vibration-limiting work piece supporting device for limiting vibrations caused by drilling to maintain drilling tool integrity and bore quality.

SUMMARY OF THE GENERAL INVENTIVE CONCEPT

In an exemplary embodiment, there is provided a work piece supporting device for limiting vibrations caused by work piece processing. The device comprises a base portion having a plurality of openings therein. Each opening forms a well with an inner boundary and a peripheral surface extends therefrom. A plurality of elongate supports are each arranged to be located in a corresponding well for supporting the work piece when positioned above the base portion. A resilient support is positioned in the well between the inner boundary and the elongate support. The elongate support is movable between a first position in which the resilient support is in a relatively less compressed configuration and a second position in which the resilient support is in a relatively more compressed configuration.

In some exemplary embodiments, the resilient support includes an o-ring.

In some exemplary embodiments, at least a portion of each elongate support has a uniform diameter, while each elongate support includes a top portion and a bottom portion, the top portion having a having a relatively lesser diameter than the bottom portion.

In some exemplary embodiments, each elongate support has a frusto-conical portion located between the top portion and the bottom portion.

In some exemplary embodiments, the base portion has a pair of opposed surfaces, one of which is in contact with a work surface to form the plurality of wells therewith.

Some exemplary embodiments further comprise a plurality of peripheral first clamp units for clamping a peripheral region of the work piece atop the elongate supports relative to the work surface and in a manner to permit lateral movement of the work piece due to flexural strain during processing.

In some exemplary embodiments, each peripheral clamp unit includes a clamp arm and a clamp body. The clamp body is secured relative to the work surface and the clamp arm is removably coupled to the clamp body near a first end region thereof by way of an adjustable fastener.

In some exemplary embodiments, the clamp arm includes a second end region for supporting a movable pin. The pin has a work piece communicating end located thereon and is operable for movement relative to the second end for engaging the engaging work piece.

In some exemplary embodiments, the pin includes a threaded rod and the second end of the clamp arm has a complementary threaded bore therethrough for operably receiving the threaded rod.

In some exemplary embodiments, the pin includes an anti-marking covering located at the work piece communicating end for substantially preventing marking of the work piece.

Some exemplary embodiments further comprise at least one second clamp unit for clamping a local region of the work piece relative to the work surface in the vicinity of a work piece processing tool.

In another exemplary embodiment, there is provided a gantry milling machine assembly, comprising a bed defining a work surface. A gantry bridge assembly is positioned above the bed and movable along an x-axis. The gantry bridge assembly includes a drill head carriage which is movable along a y-axis relative to the gantry bridge assembly and across the bed. The drill head carriage supports a drill head, which includes a spindle movable on a z-axis relative to the drill head carriage. A work piece supporting device is provided as defined above and positioned on the bed. A plurality of first clamp units is secured relative to the bed for clamping a first local region in a peripheral area of a work piece thereon. A second clamp unit is mounted on the gantry bridge assembly for clamping the work piece in a second local region surrounding the spindle. The first clamp units are configured for locating the work piece on the elongate supports and each is provided for delivering a first clamp load in a corresponding first local region on the work piece, while permitting lateral movement thereof due to flexural strain. The second clamp unit is configured for pressing the second local region of the work piece against the elongate supports and permitting substantially no lateral movement.

In some exemplary embodiments, the second clamp unit is configured for fully compressing the resilient supports associated with at least a number of elongate supports in the second local region. The first clamp units are configured for partially compressing the resilient supports of the elongate supports adjacent the corresponding first local region of each second clamp unit.

In some exemplary embodiments, the second clamp unit further comprises a support housing mounted on the drill head carriage. The support housing supports a hydraulic cylinder, which further includes a piston portion extending beyond a lower boundary of the support housing. A support leg is slidably mounted in the support housing. A pressure foot is also provided with a proximal end region mounted to the support leg and a distal end region and movable along a path substantially parallel to the z axis. The piston has a remote end engaged with the pressure foot between the distal end region and the proximal end region. The distal end region is configured for engaging the work piece in the first local region.

In some exemplary embodiments, the distal end region includes a contact pad. The contact pad includes an offset portion defining a lower surface for contacting the work piece. If desired, the contact pad may be further configured to receive a supplemental contact pad.

In yet another alternative embodiment, there is provided a method for limiting vibrations of a work piece drilling comprising the steps of:
 a) providing a vibration-limiting work piece support device of claim as defined herein;
 b) placing the work piece on the work piece supporting device such that the work piece is supported by the elongate supports;
 c) securing the work piece to the work piece supporting device by way of a plurality of peripheral first clamp units configured to permit lateral movement due to flexural strain;
 d) positioning a gantry bridge assembly above the work piece and operable for movement in an x-axis relative to the base portion; the gantry bridge assembly further comprising:
  a drill head assembly having a drill head carriage for movement in a y-axis relative to the gantry bridge assembly; the drill head carriage supporting a drill head, the drill head mounted for movement in a z-axis relative to the drill head carriage; the drill head including a spindle for rotating a drilling tool for processing the work piece;
  the drill head carriage including a second clamp unit mounted thereon for clamping the work piece in a local region surrounding the spindle;
 e) engaging the second clamp unit with the work piece so as to substantially inhibit lateral movement; and
 d) processing the work piece.

In another exemplary embodiment, there is provided a work piece support device comprising a base portion having a plurality of passages therein. Also provided are a plurality of first non-resilient elongate support portions and a plurality of second resilient support portions. The first and second support portions are organized in work piece support groups of two, with each work piece support group being associated with a corresponding passage. The second support portion is located in the passage and is positioned against an inner boundary thereof with the first support portion against the second support portion. The first support portion includes a distal end region arranged to extend outwardly from the passage and beyond a work support area on the base portion. The first portions are arranged, collectively, to provide a pattern of discrete support locations in the work support area sufficient to support a target portion of the work piece during a work piece processing operation. Each support group is configured to move between a first work piece supporting position in which the second support portion is in a relatively less compressed configuration and a second work piece supporting position in which the second support portion is in a relatively more compressed configuration and biasing the first support portion toward the first position.

In some exemplary embodiments, the second support portion includes an o-ring.

In some exemplary embodiments, the first support portion has a first diameter sufficient for sliding travel in the passage, and a second relatively smaller diameter at the distal end region.

Some exemplary embodiments further comprise a plurality of first peripheral clamp units for clamping the work piece with the first support portions in the first work piece supporting position.

Some exemplary embodiments further comprise a work piece processing portion for processing the work piece at a target location, and further comprise at least one second clamp unit for clamping the work piece near the target location. The second clamp unit is arranged to deliver the first support portion of one or more work piece support groups near the target location to the second position.

In yet another exemplary embodiment, there is provided a method of limiting vibration in a work piece comprising:
 providing a device as defined herein;
 positioning a work piece on the distal end regions of the second support portions within the work piece support area;
 clamping a sufficient portion of a peripheral region of the work piece to place corresponding work piece support groups near the peripheral region in the first position;
 clamping a region around a target location on the work piece to place one or more work piece support groups near the target location in the second position; and
 processing the work piece at the target location.

In still another exemplary embodiment, there is provided a gantry milling machine assembly, comprising a bed defining a work surface. A gantry bridge assembly is positioned above the bed and movable along an x-axis. The gantry bridge assembly includes a drill head carriage which is being movable along a y-axis relative to the gantry bridge assembly and across the bed. The drill head carriage supports a drill head. The drill head includes a spindle movable on a z-axis relative to the drill head carriage. A clamp unit is mounted on the gantry bridge assembly for clamping the work piece in a local region surrounding the spindle. The clamp unit is configured for pressing the local region of the work piece against the bed. The clamp unit further comprises a support housing mounted on the drill head carriage. The support housing supports a hydraulic cylinder which further comprises a piston portion extending beyond a lower boundary of the support housing. A support leg is slidably mounted in the support housing. A pressure foot has a proximal end region mounted to the support leg and a distal end region and is movable along a path substantially parallel to the z axis. The piston has a remote end engaged with the pressure foot between the distal end region and the proximal end region; and the distal end region is configured for engaging the work piece in the local region.

BRIEF DESCRIPTION OF THE DRAWINGS

Several exemplary embodiments of the present invention will be provided, by way of examples only, with reference to the appended drawings, wherein.

DESCRIPTION OF THE EXEMPLARY EMBODIMENTS

It should be understood that the invention is not limited in its application to the details of construction and the arrangement of components set forth in the following description or illustrated in the drawings. The invention is capable of other embodiments and of being practiced or of being carried out in various ways. Also, it is to be understood that the phraseology and terminology used herein is for the purpose of description and should not be regarded as limiting. The use of "including," "comprising," or "having" and variations thereof herein is meant to encompass the items listed thereafter and equivalents thereof as well as additional items. Unless limited otherwise, the terms "connected," "coupled," and "mounted," and variations thereof herein are used broadly and encompass direct and indirect connections, couplings, and mountings. In addition, the terms "connected" and "coupled" and variations thereof are not restricted to physical or mechanical connections or couplings. Furthermore, and as described in subsequent paragraphs, the specific mechanical or other configurations illustrated in the drawings are intended to exemplify embodiments of the invention. However, alternative mechanical or other configurations are possible which are considered to be within the teachings of the instant disclosure. Furthermore, unless otherwise indicated, the term "or" is to be considered inclusive.

Figure 1:
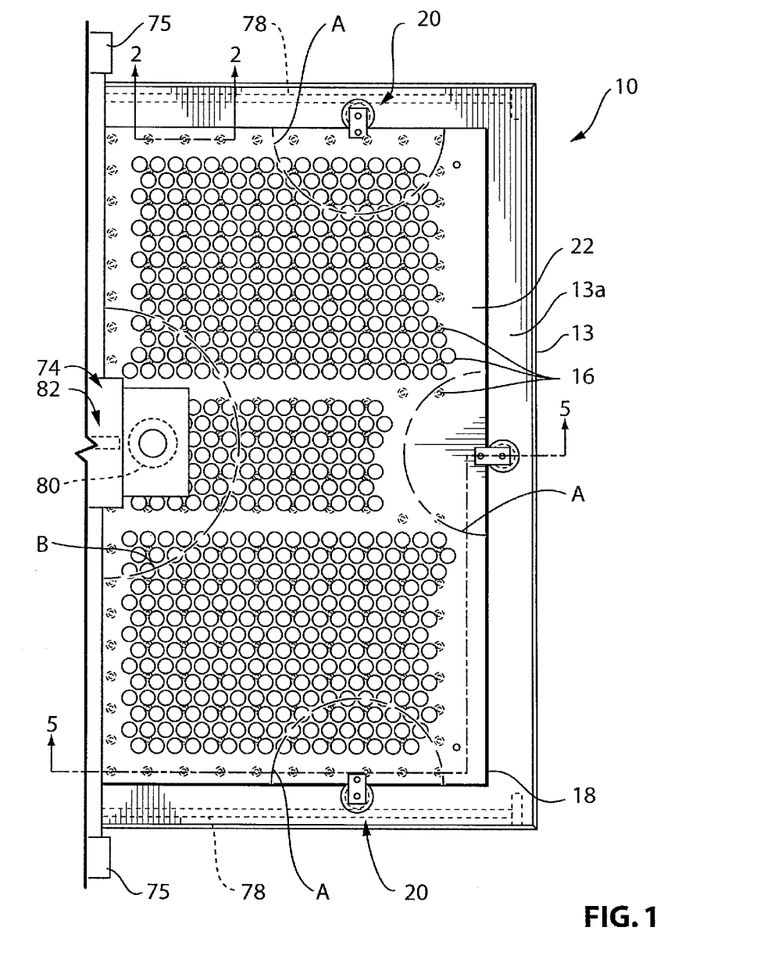
FIG. 1 is a fragmentary top plan view of a vibration-limiting work piece supporting device in an operative position.
Figure 5:
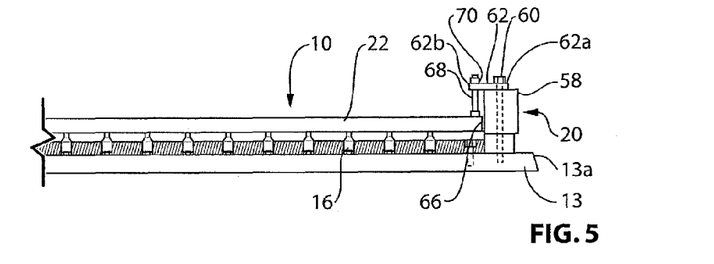
FIG. 5 is a another fragmentary part-sectional side view taken on line 5-5 of FIG. 1

With reference to the figures (particularly FIGS. 1, 2 and 5), a vibration-limiting work piece supporting device is provided at 10 having a base portion 12 with a plurality of wells 14 disposed therein. In this case, the wells 14 are formed by openings in the base portion 12 which are bounded by a work surface 13a formed on a machine table 13. An elongate support 16 is slidably mounted in each of the wells 14 for supporting a work piece 22. In this case the work piece includes one or more plates of metal. With reference to FIGS. 1 and 5, a number of peripheral first clamp units 20 are located about the periphery 18 of the base portion 12 for maintaining the work piece 22 in an operative position supported atop the elongate supports 16 on the base portion 12.

Each of the wells 14 has a sealed bottom portion 24 (formed by the installation of the base portion 12 against the machine table 13) and an outer periphery 26 which is complementary to an outer side wall 28 of the elongate supports 16, such that the elongate supports 16 may be slidably inserted into the wells 14 and may substantially freely move within the plane of the well 14 to absorb tool-induced vibrations caused by drilling. The device 10 may also, in certain applications, be employed to limit vibrations caused by other types of tools separate from drilling tools. For example, the device 10 may be employed to limit vibrations caused by milling or cutting tools and the like.

A resilient support 30 is positioned in the well 14 and has a central passage 32 and an outer seal periphery 34 for frictionally engaging the outer periphery 26 of the well. The bottom surface 36 of the elongate supports 16 is also complementary to a top portion 38 of the resilient support 30

Figure 3:
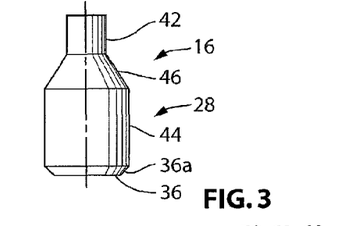
FIG. 3 is a side view of an elongate support of the device of FIG. 1.
Figure 6:
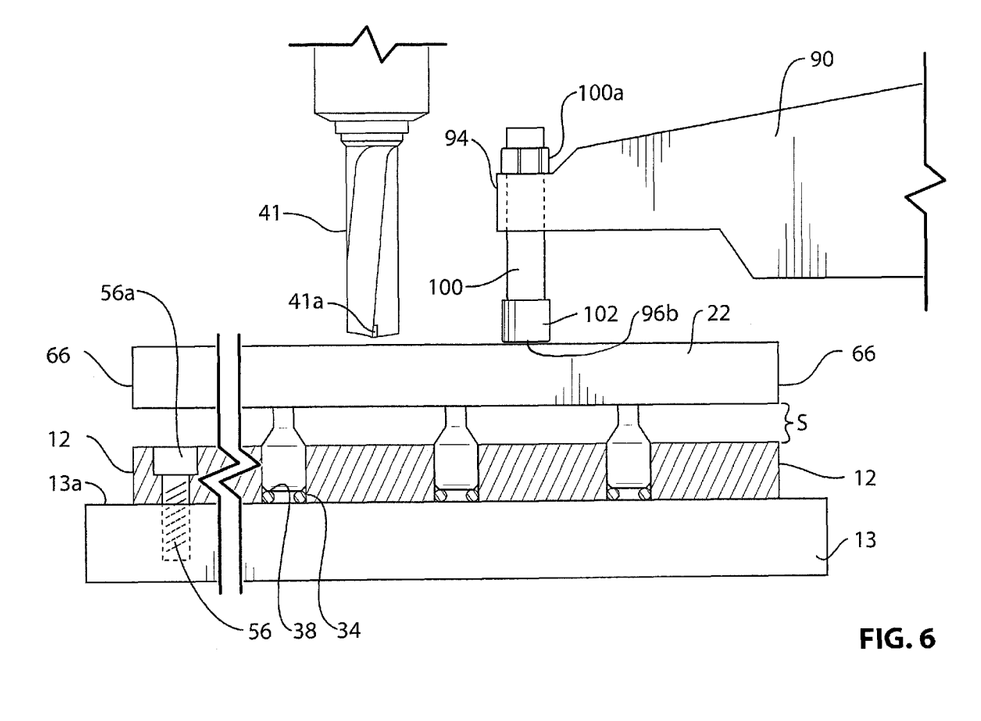
FIG. 6 is magnified fragmentary part-sectional side view of a portion of an alternative device with a number of resilient supports in a non-compressed position.
Figure 7:
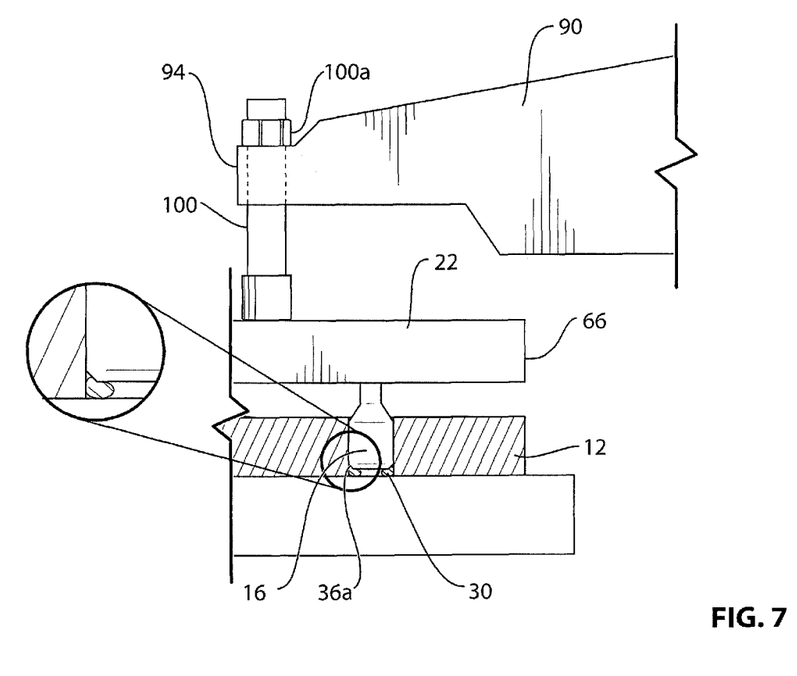
FIG. 7 is another magnified fragmentary sectional side view according to FIG. 6, with the resilient supports in a compressed position.

In practice, the resilient support 30, as shown in FIG. 7 substantially absorbs tool-induced vibrations which are transferred to the work piece 22 resultant of the action of drilling a bore into or through the work piece 22. The vibration energy is transferred from the work piece 22 to the elongate supports 16 and is substantially absorbed by the compressed resilient support 30, thus allowing for an improved bore quality and implementation of relatively higher speed drilling than is conventionally achievable. Therefore, the integrity of drilling tools and resultant hole quality may be maintained for a longer period of time during use. In other words, the resilient support 30 substantially absorbs energy from the vibrations sent from a drilling tool, shown for example at 41 in FIG. 6, where the energy may be dissipated in another form, such as heat. If the work piece 22 tends to vibrate up or down relative a neutral non-vibrating plane, the resilient support 30 cycles between a compressed (or relatively more compressed) position as shown in FIG. 7 and a decompressed (or a relatively less compressed) position as shown in FIG. 6, thereby substantially absorbing energy from the tool-induced vibrations. Referring to FIG. 3, the bottom surface 36 of the elongate support has a beveled corner region 36a which provides an annular space for receiving a squeezed portion of the resilient support 30 (FIG. 7) as it becomes compressed, further enhancing the compression. Therefore, the resilient support 30 provides the device 10 with a means to effectively reduce and dampen vibrational energy resulting from tool-induced vibrations and thus serve to improve bore quality and/or allow for higher-speed drilling than is conventionally available.

The resilient support 30 in various exemplary embodiments may be provided as a rubber o-Ring, a resilient flat washer, a grommet, a steel Belleville washer, or other suitable dampening means as may be suitably employed. In the case of the resilient support 30, it may be provided in the form of an elastomeric material or elastomeric materials as are conventionally known in the art. Suitable materials, from which the resilient support 30 may be fashioned, are for example, natural rubber, synthetic rubber, Neoprene or chloroprene ethylene propylene, acrylonirtile butadiene, chlorosulfonated polyethylene, styrene butadiene, isobutylene isoprene, Fluorosilicone or fluoroalkyl polysiloxane, Silicone or polysiloxane, fluoroalkyl polysiloxane, and Urethane or polyester, among others.

Figure 2:
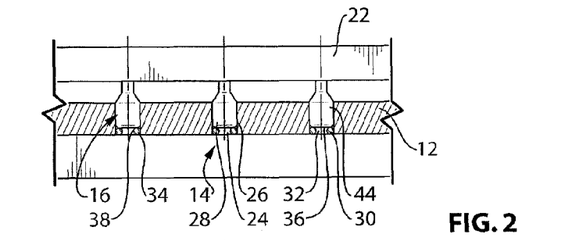
FIG. 2 is a fragmentary sectional side view taken on line 2-2 of FIG. 1.
Figure 4:
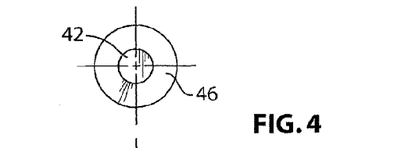
FIG. 4 is a top plan view of the elongate support of FIG. 3.

Referring to FIG. 4, each of the elongate supports 16 has a top portion 42 and a bottom portion 44. In this case, the top portion 42 has a lesser diameter than the bottom portion 44, with a frusto-conical portion 46 extending therebetween. The larger diameter end of the frusto-conical portion 46, in various embodiments may commence such that when the resilient support 30 is in a compressed position, as is shown in FIG. 7, the commencement point the frusto-conical portion 46 remains at below the level of the top of the base portion 12. In various other embodiments (not shown), the commencement point of the large diameter end of the frusto-conical portion 46 may be above or, alternatively level with the top of the base portion 12 when the resilient support 30 is in a compressed position. When the resilient support 30 is not compressed, as is shown in FIG. 2, the commencement of the frusto-conical portion 46, in certain embodiments, is at the level of the top of the base portion 12. The top portion 42 of the elongate support 16, being of a lesser diameter, serves to allow less surface area of the work piece 22 being in contact with the elongate support 16, thus allowing for more area in which a bore may be made through the work piece 22 without the chance of a drilling tool 41 (FIG. 6) coming into contact with the elongate support. This allows a relatively open region between the elongate supports 16, allowing them to be placed in a first predetermined pattern so as to accommodate a second predetermined pattern of holes or other formations to be made in the work piece, with each hole being between and clear from contact with the elongate supports.

Figure 8:
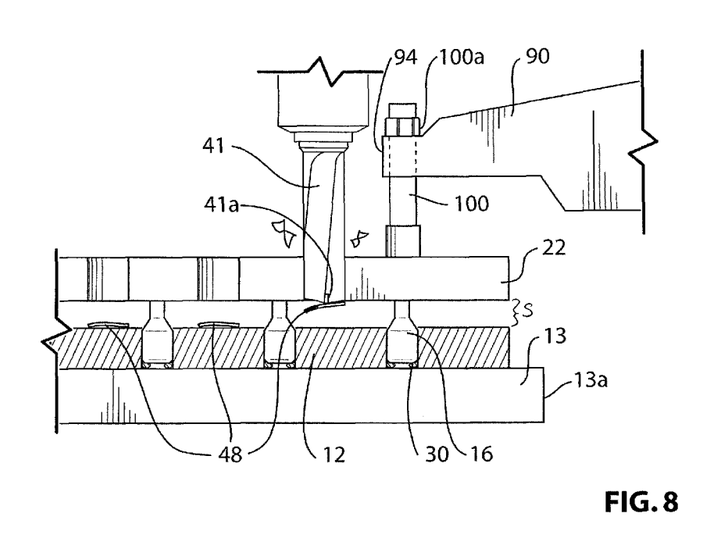
FIG. 8 is still another magnified fragmentary sectional according to FIG. 6 in an operative configuration with a work piece processing tool.

The elongate supports 16 also serve to form a space "S" between the underside of the work piece 22 and the base portion 12. With reference to FIG. 8, for exemplary purposes, when drilling with drilling tools 41 such as those with carbide cutting inserts 41a and creating a bore through the work piece 22, disk-like tailings 48 are created as the drilling tool emerges from the bottom of the work piece 22. These tailings 48 can range from a fraction of millimeter to, in some cases, 1.5 millimeters or greater in thickness. When the drilling tool 41 emerges from the underside of the work piece 22, it is important that the tailings 48 drop away free from the tip of the cutting insert 41a and fall in the space "S" between the work piece 22 and the base portion 12 as is shown in FIG. 8. If the drilling tool comes into contact with a tailing 48 several undesirable outcomes may happen. For example, if the drilling tool presses down on the tailing 48 as it completes the bore through the work piece 22, the tailing 48 may begin to spin, possibly causing damage to the work piece 22, the drilling tool 41 or the elongate support 16. Or, if the drilling tool lacks the sufficient force to "crush through" the spinning tailing 48 (as a result of the drilling tool pressing down on the tailing 48), the drilling tool 41, and its supporting cutting tool holder, may be damaged. Therefore, with the work piece 22 supported atop the elongate supports 16 and clamped in position, as will be discussed, the drilling tool 41 may bore a single cut hole or a web of cut holes. The relatively narrower top portions 42 of the elongate supports 16 provide a space for the tailings 48, each created by the drilling tool as it emerges from boring a hole, to fall away freely into the space "S", thus minimizing, if not substantially avoiding, damage to the drilling tool, the cutter holder, and the work piece 22.

As will be described, the device 10 is securely fastened to a machine table 13 providing a work surface 13a, in this case as part of a gantry machining device shown at 54 in FIG. 9. In this case, as seen in FIG. 6, the base portion 12 is provided with a number of passageways, one of which being shown at 56 bored therethrough for receiving a bolt 56a or screw which may be reversibly coupled to the machine table 13. In this regard, the bolt 56a couples or anchors the device 10 to the machine table 50 to be maintained substantially free of movement from a desired location during use.

The peripheral first clamp units 20 are shown in more detail in FIG. 5. Each is configured to provide a relatively firm load to the work piece 22 sufficient to make assertive contact between the work piece 22 and the elongate supports 16. This relatively firm load is intended to slightly compress the resilient support 30 associated with a relatively small group of elongate supports 16 in the immediate vicinity of the clamp unit, as represented for example by a region "A" surrounding each peripheral first clamp unit 20, as shown in FIG. 1. In the region "A", lateral movement of the work piece 22 is permitted due to flexural strain during a work piece processing operation. The relatively firm load may be, for example, in the order of about 50 to 250 kilograms. In one example, the load may be about 100 kilograms. In this case, the term "kilogram" is a unit of measure of the force being applied by peripheral first clamp units 20. However, other operable downwardly applied loads may be used as desired, in order to provide sufficiently maintain the work piece 22 in a user-desired location atop the elongate supports 16 allowing the elongate supports 16 sufficient travel as needed to absorb vibratory motion induced and allow slight lateral (or horizontal) movement due to vertical flexural strain during operation.

With reference to FIG. 5, each peripheral first clamp unit 20 includes a clamp body 58 which is affixed to the machine table 13 by way of an adjustable fastener 60. A clamp arm 62 extends outwardly from the clamp body 58 and has a first end 62a and a second end 62b. Near the first end 62a, the clamp arm 62 is removably coupled to the clamp body 58 by way of the adjustable fastener 60. The second end 62b extends over peripheral edge 66 of the work piece 22. A pin 68 extends through and is threadably engaged with the clamp arm 62 near its second end 62b. The pin 68 has a lower remote end region arranged to engage the work piece 22 and apply downward loads, as discussed above. In practice, the user may rotate the pin 68 to adjust its position relative to the work piece 22 and apply the downward load, thus securing and maintaining the work piece 22 with the device 10 atop the elongate supports 16 to slightly compress the resilient support 30. In this case, a locking nut 70 is also provided on the pin 68 for securing the pin 68 in a clamping position relative to the work piece 22.

Figure 9:
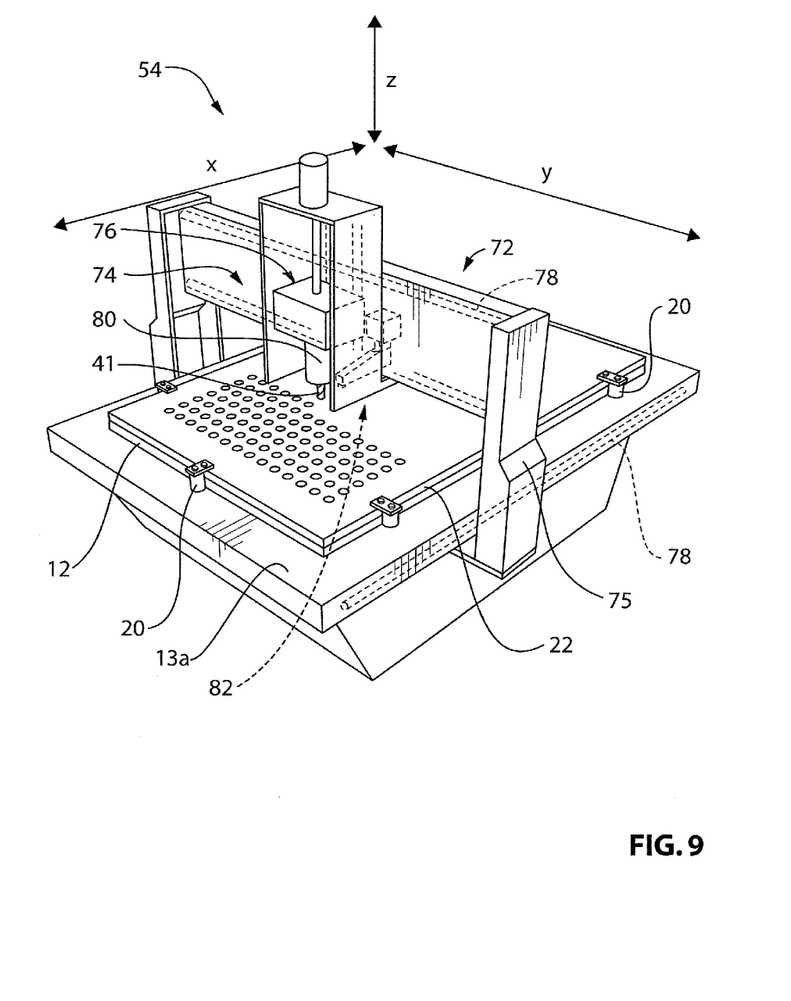
FIG. 9 is a perspective view of a work piece support device including a gantry bridge assembly.

With reference to FIG. 9, the gantry machining device 54 includes a gantry bridge assembly generally shown at 72, movable in the x-axis relative to the work surface 13a. The gantry bridge assembly 72 has a drill head carriage generally shown at 74 located thereon and in the y-axis along the gantry bridge assembly 72 relative to the work surface 13a. The drill head carriage 74 supports the drill head 76 which is movable in a z axis relative to the drill head carriage 74. As shown in FIGS. 1 and 9, the work piece 22 is shown atop the base portion 12 and maintained in a user-desired location by a plurality of peripheral first clamp units shown schematically at 20. The gantry bridge assembly 72 is slidably mounted, by way of gantry support members 75, on a rail system with rails 78 located in parallel about opposite sides of the work surface 13a for moving the gantry bridge assembly 72 in the x-axis. The drill head carriage 74 is slidably mounted on carriage rails 78 extending along the gantry bridge assembly 72 and operable for movement of the drill head carriage 74 in the y-axis. The drill head 76 has a spindle 80 operable for movement in the z-axis and providing rotational force to the drilling tool 41 relative to the work surface 13a for processing the work piece 22. The drill head carriage 74 also includes a second clamp unit 82 for clamping the work piece 22 in a local region "B" (as shown in FIG. 1) surrounding the spindle 80 and is configured for securing the local region of the work piece 22 against the elongate support 16, more fully compressing the resilient support 30, and substantially inhibiting lateral movement of the work pieces 22.

Figure 10:
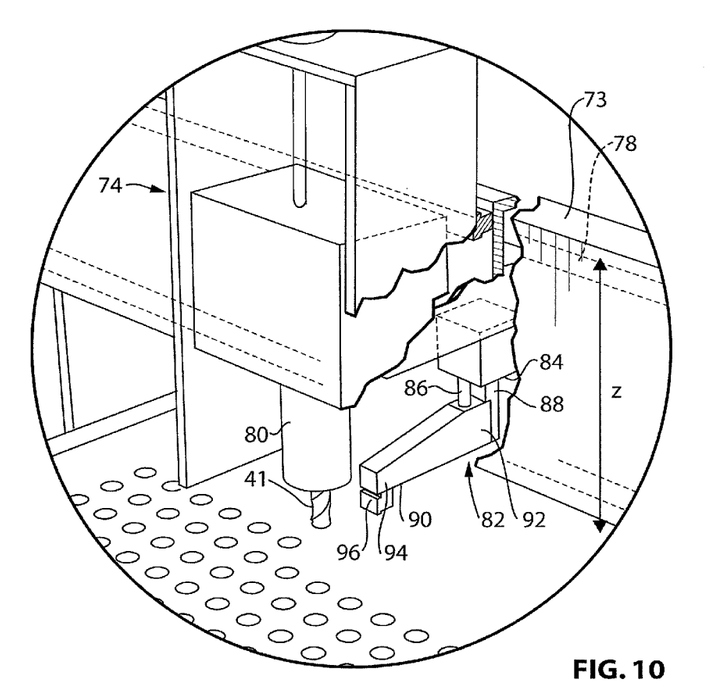
FIG. 10 is a magnified view of a portion of the gantry bridge assembly FIG. 9.

As shown in FIG. 10, the second clamp unit 82 includes a support housing 84 coupled to the drill head carriage 74. The support housing 84 supports a hydraulic cylinder (not shown) and the hydraulic cylinder has a piston 86 which is fashioned to extend beyond a lower boundary of the support housing 84 and move in the z-axis. A support leg 88 is also slidably mounted in the support housing 84 and moves in a path parallel to the z-axis. A pressure foot 90 having a proximal end region 92 is mounted to the support leg 88. The pressure foot 90 has a distal end region 94 which is provided for engaging the work piece 22 in the local region "B" surrounding the spindle 80. The piston 86, in this case, is fixed to the pressure foot 90 beside the support leg 88.

Figure 10A:
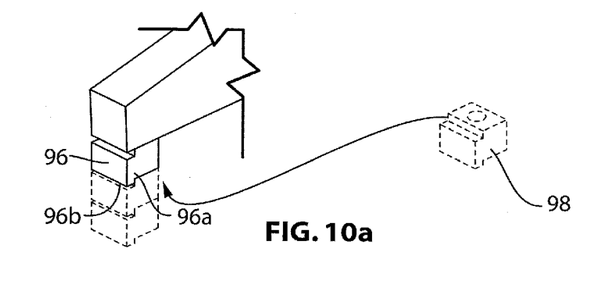
FIG. 10a is a fragmentary perspective view of a pressure foot of FIG. 10.

The distal end region 94 includes a contact pad 96 having an offset portion 96a which defines a lower clamp surface 96b for contacting the work piece 22. In various embodiments, the contact pad 96 may also be configured to receive a supplemental contact pad 98 for further aiding in the pressure foot 90 engaging the work piece 22 in situations where the distance between the lower surface of the pressure foot 90 and the work piece 22 is increased due to work piece 22 thickness or other factors, thereby to reduce piston travel and save production time.

The second clamp unit 82 is provided to fully compress the resilient supports 30, in the local region "B" surrounding the spindle, as is shown in FIG. 1. The second clamp unit 82 provides approximately 1000 kilograms of downward load in the z-axis to the press the work piece 22 atop the elongate supports 16. However, the load in the z-axis applied by the second clamp unit 82 may be variable, for example between about 250 kilograms 1000 kilograms, or more in some cases, dependent on the hole size and the required application. The load applied, in this particular example, should be sufficient to substantially inhibit vertical and/or slight lateral vibrational or other movement of the work piece 22 in the local region "B" surrounding the spindle 80 during the processing. Other applications may provide for an increased degree of vibrational or other movement of the workpiece.

The first and second clamp units 20, 82 may be provided in different configurations as desired to provide sufficient clamping for the elongate supports together with the base portion 12, the resilient support to absorb vibrational energy to improve machining quality. For instance, the pressure foot 90 may be provided with different configurations at its distal end region 94 to define the lower clamp surface 96b. One such example is shown in FIGS. 6, 7 and 8 which provide a threaded fastener 100 which extends through a threaded passage in the distal end region 94 and is provided with a lock nut 100a for locking the position of the fastener 100 in one operating position, with the lower clamp surface 96b formed on a lower end portion 102. In this case, if desired, the fastener 100 may be provided with an anti-marking covering on the lower clamp surface 96b minimizing marking of the work piece.

To operate the device 10, the user places a work piece 22 atop the elongate supports 16 and orients the work piece 22 in a desired position, bearing in mind the first and second patterns discussed above. The user then engages the first clamp units 20 to secure and maintain the work piece 22 to the device 10 atop the elongate supports 16 with sufficient pressure to slightly compress the resilient supports 30 in the local region "A", while permitting lateral movement of the work piece 22 during processing owing to lateral (or horizontal) flexural strains, as described above. The user may then position the gantry bridge assembly 72 and drill head carriage 74 for engagement of the second clamp unit 82 with the work piece 22, wherein the second clamp unit 82 provides sufficient downward pressure in the z-axis to fully compress the resilient support 30 in the local region "B" of the work piece 22 surrounding the spindle 80. The user may then begin drilling a bore into, or otherwise process, the work piece 22. Furthermore, in this embodiment, the gantry bridge assembly 72 may receive co-ordinates or a series of co-ordinates from the user or an automated system for the correct positioning of the drill head carriage 74 and the second clamp unit 82 in order to dill a bore into or process the work piece 22. The device 10, in this regard, provides a means for substantially absorbing the tool-induced vibrational energy and thus provides a dampening action to substantially provide an improvement in bore quality and/or allow for higher drilling tool speeds than one is conventionally able to employ.

Figure 11A:
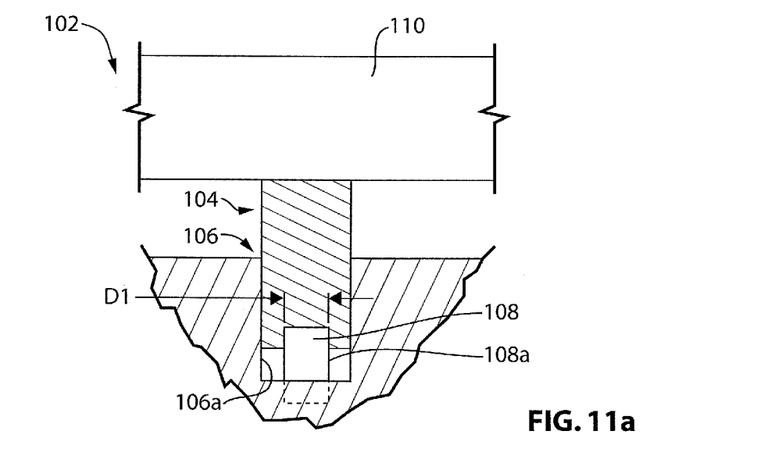
FIGS. 11a and 11b are fragmentary cross sectional views of another vibration-limiting work piece supporting device.
Figure 11B:
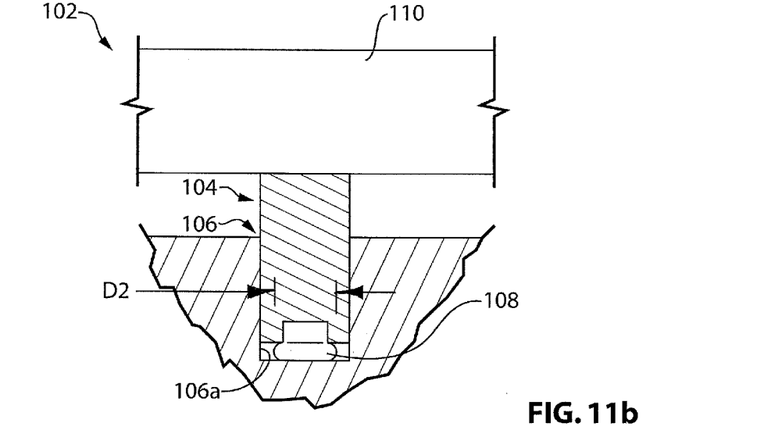
Figure 12:
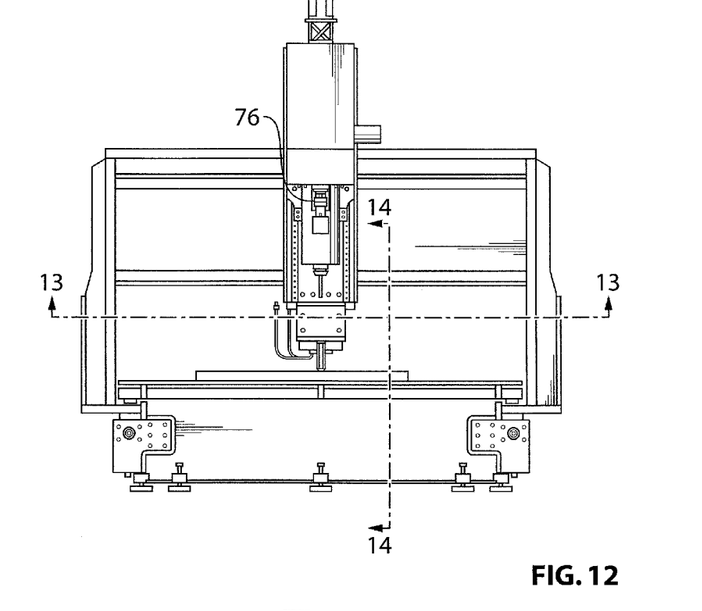
FIG. 12 is another view of the gantry bridge assembly of FIG. 9.
Figure 13:
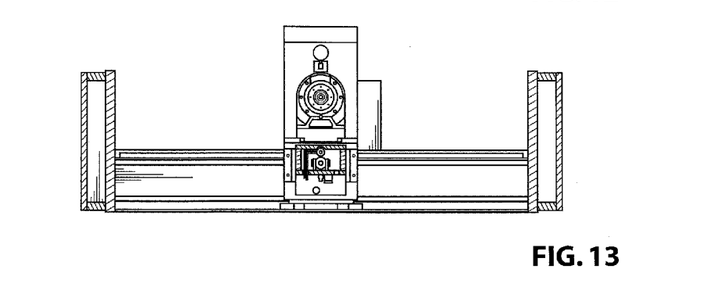
FIG. 13 is a sectional view taken on line 13-13 of FIG. 12.
Figure 14:
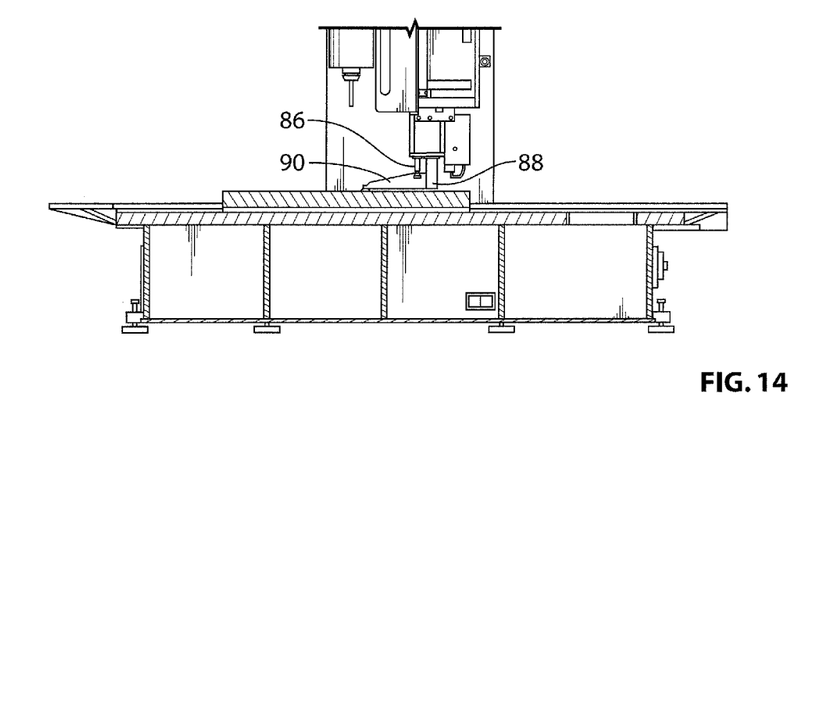
FIG. 14 is a sectional view taken on line 14-14 of FIG. 12.

Another vibration limiting work piece support device is shown at 102 in FIGS. 11a and 11b, in this case with a cylindrical elongate support 104 located in a well 106. The well has an outer periphery 106a. Located below the elongate support 104 is a resilient support 108. In this example, the resilient support 108 is cylindrical, that is with a cylindrical outer side wall 108a, but may also be provided in other shaped configurations as desired. The diameter of the resilient support 108 is shown at D1 in its uncompressed position in FIG. 11a. It can be seen that the diameter of the resilient support 108 expands to D2 in the compressed position of figure 1 lb and is able to expand into space in the well 106 below the elongate support 104 and between the outer side wall 108a and the outer periphery 106a. Thus, the resilient support 108 may be provided in a number of configurations and, like the resilient support 30 of the earlier embodiment, enables the elongate support 104 to travel within the well 106 in response to vibrations occurring on the work piece 110. In this case, the resilient support 108 is positioned in a cavity 104a at the lower end of the elongate support. Alternatively, the resilient support may be positioned in a cavity 109 in the base portion 112.

Those of skill in the art will recognize certain modifications, permutations, additions and sub-combinations thereof of parts noted herein. While the device 10 has been described for what are presently considered the preferred embodiments, the invention is not so limited. To the contrary, the invention is intended to cover various modifications and equivalent arrangements included within the spirit and scope of the appended claims. The scope of the following claims is to be accorded the broadest interpretation so as to encompass all such modifications and equivalent structures and functions.

The invention claimed:

1. A work piece supporting device for limiting vibrations caused by work piece processing, comprising:
   a base portion having a plurality of openings therein, each of said openings forming a well with an inner boundary and a peripheral surface extending therefrom;
   a plurality of elongate supports, each of said plurality of elongate supports arranged to be located in a corresponding said well for supporting the work piece when positioned above said base portion;

a resilient support positioned in said well between said inner boundary and said elongate support, said elongate support movable between a first position in which said resilient support is in a relatively less compressed configuration and a second position in which said resilient support is in a relatively more compressed configuration; and a plurality of peripheral first clamp units for clamping a peripheral region of the work piece atop said elongate supports relative to the work surface and in a manner to permit lateral movement of the work piece due to flexural strain during processing;

each of said peripheral first clamp units having a clamp arm and a clamp body, said clamp body secured relative to the work surface and said clamp arm removably coupled to said clamp body near a first end region thereof by way of an adjustable fastener.

2. The device as defined in claim 1, wherein said resilient support includes an o-ring.

3. The device as defined in claim 1, wherein at least a portion of each said elongate support has a uniform diameter.

4. The device as defined in claim 1, wherein each of said elongate supports includes a top portion and a bottom portion, said top portion having a relatively lesser diameter than said bottom portion.

5. The device as defined in claim 4, wherein each of said elongate supports having a frusto-conical portion located between said top portion and said bottom portion.

6. The device as defined in claim 1, wherein said base portion has a pair of opposed surfaces, one of said pair of opposed surfaces being in contact with a work surface to form said plurality of wells therewith.

7. The device as defined in claim 1, wherein said clamp arm includes a second end region for supporting a movable pin, said pin has a work piece communicating end located thereon;

said pin being operable for movement relative to said second end region for engaging the work piece.

8. The device as defined in claim 7, wherein said pin includes a threaded rod and said second end region of said clamp arm has a complementary threaded bore therethrough for operably receiving said threaded rod.

9. The device as defined in claim 8, wherein said pin includes an anti-marking covering located at said work piece communicating end for substantially preventing marking of the work piece.

10. The device as defined in claim 1, further comprising at least one second clamp unit for clamping a local region of the work piece relative to the work surface in the vicinity of a work piece processing tool.

11. A work piece supporting device for limiting vibrations caused by work piece processing, comprising:

a base portion having a plurality of openings, each of said openings forming a well with a well bottom portion and an outer peripheral surface extending therefrom;

a plurality of elongate supports having a top portion and bottom portion, said bottom portion having a bottom surface, said bottom surface having a beveled edge about a periphery;

each of said plurality of elongate supports located in a corresponding said well for supporting the work piece when positioned above said base portion; and a resilient support positioned in said well in supporting contact between each said well bottom portion and said bottom surface of said elongate support bottom portion, said elongate support movable between a first position in which said resilient support is in a relatively less compressed configuration and a second position in which said resilient support is in a relatively more compressed configuration, a portion of the resilient support being received in a space formed by said beveled edge and said outer peripheral surface when said elongate support is in the second position.

12. The device as defined in claim 11, wherein said resilient support comprises an o-ring.

13. The device as defined in claim 11, wherein at least a portion of each said elongate supports has a uniform diameter.

14. The device as defined in claim 11, wherein said top portion of said elongate supports have a relatively lesser diameter than said bottom portion of said elongate supports.

15. The device as defined in claim 11, said base portion having a pair of opposed surfaces, one of said pair of opposed surfaces being in contact with a work surface to form said plurality of wells therewith.

16. The device as defined in claim 15, further comprising a plurality of peripheral first clamp units for clamping a peripheral region of the work piece atop said elongate supports relative to the work surface and in a manner to permit lateral movement of the work piece due to flexural strain during processing.

* * * * *